UNITED STATES PATENT OFFICE.

ROBERT HÜBNER, OF NEW YORK, N. Y., ASSIGNOR TO FRITZ SCHWYZER, OF NEW YORK, N. Y.

CAFFEIN-FREE COFFEE.

947,577.  Specification of Letters Patent.  Patented Jan. 25, 1910.

No Drawing.  Application filed July 2, 1908. Serial No. 441,710.

*To all whom it may concern:*

Be it known that I, ROBERT HÜBNER, a subject of the Emperor of Germany, residing at New York city, county and State of New York, have invented an Improvement in Caffein-Free Coffee, of which the following is a specification.

My invention consists in a process of extracting caffein from coffee, and the object of my invention is to remove from coffee that substance, caffein, which renders it deleterious to health.

To carry my invention into effect, raw coffee beans are distributed over the surface of a shallow dish or pan and covered with water having a temperature of approximately 15 degrees centigrade. There should be sufficient water to cover the beans and maintain them covered during the time they are immersed and absorbing water. The beans should remain immersed until they have doubled in size, or otherwise have absorbed all the water which they will take up. The time of immersion will therefore vary between twelve and twenty-four hours, depending upon the quality, condition of ripeness and age of the bean. If the beans are old or dirty, or mixed with other substances, it may be necessary to change the water a number of times. After the beans have swollen to double their size and the water or waters used in the preliminary treatment above described removed, they are again immersed in water under the same conditions and at the same temperature, and allowed to remain immersed until partial germination has been accomplished,—or in other words, until, by chemical tests, the presence of maltose can be detected.

It is important, in carrying out the process, to keep the beans covered by water having the temperature stated, as otherwise the albuminous or starchy bodies will be too much converted, and thus cause too rapid germination and consequent sprouting, which would split up or otherwise destroy the aromatic properties of the beans. As soon as the presence of maltose is detected, which indicates that partial germination has been accomplished, and the preliminary waters withdrawn, steps should be taken to stop germination. This may be accomplished by washing the beans with water having a temperature of from fifty to sixty degrees centigrade, until the gum-like coating of the beans (caffetannic acid) and most of the remaining caffein is washed away.

Any suitable apparatus may be used for washing the beans. After the beans are washed by the hot water and germination stopped, they are dried, which should be effected at a temperature of from 25 to 40 degrees centigrade, and this may be best accomplished by distributing the beans in thin layers on pans and passing a current of hot air over them. Drying in sunlight is to be avoided as it tends to oxidize and discolor the beans.

From the watery solution obtained by the treatment above described, caffetannic acid, caffeic acid, organic coloring matter, salts, etc. are precipitated. This may be accomplished by any well known means, as for instance, by the addition of any basic material such as sodium, potassium or calcium. The watery extract, from which the precipitated matters have been removed, is then concentrated and the caffein separated therefrom by the employment of chloroform or other readily volatilizable substance, and subsequently the chloroform or other volatilizable substance removed by subjecting it to the action of a jet of steam. The removed precipitated matters, *i. e.*, the caffetannic acid, caffeic acid, organic coloring matter, salts, etc., may be again made into a solution with water, and if desired, reëmbodied in the coffee beans by any suitable process, after which the beans are again dried.

From the above description it will be seen that the elementary principle involved in my process, consists in primarily effecting a limited germination of the coffee bean, which acts to break down the normal union of the combined materials in the bean, so that they may be extracted by water at the required temperature, and subsequently separated as described. I wish it to be understood that I do not limit myself to the exact steps of the process herein set forth, provided that the preliminary step involved brings about a limited germination of the bean by the water in which it is immersed or otherwise. The subsequent chemical treatment of the solutions may be any that may be required to separate the different materials. Further, I wish it understood that instead of reincorporating with the bean the material precipitated from the solution, with the exception of caffein, such material may be concentrated and pressed into tablets, and such tablets employed after the addition of hot water, as a food product.

The product of my process has as its characteristic, coffee beans of which the enveloping shell has been distended and partially broken by germination within the bean, and from which bean the major portion of the normally contained caffein has been extracted by direct and osmotic action.

Having thus described my invention, I claim:

1. The herein described process of removing caffein from the coffee bean, which consists in first effecting a limited germination within the bean and then subjecting it to the extractive action of water of the required temperature.

2. The herein described process of removing caffein from the coffee bean, which consists in first subjecting the coffee bean to the action of water at a temperature of 15 degrees centigrade, until limited germination has taken place, then to the action of washing waters at a higher temperature until the major portion of the caffein has been removed.

3. The herein described process of removing caffein from the coffee bean, which consists in subjecting the coffee bean, when distributed in a thin layer, to the action of water at a temperature of 15 degrees centigrade until limited germination has taken place, and then to the action of water at a higher temperature to remove the major portion of the caffein.

4. The herein described process of removing caffein from the coffee bean, which consists in loosening the cellular structure of the bean and producing distention of the bean by bringing about partial germination of the bean and then subjecting to the action of water at a temperature sufficient to effect removal of the soluble bodies of the bean.

5. The herein described process of removing caffein from the coffee bean, which consists in first effecting a limited germination of the beans and then subjecting the partially germinated beans to osmotic action by immersing in water of proper temperature, until the soluble contents of the beans have been extracted.

6. The herein described process of removing caffein from coffee beans, which consists in first effecting a limited germination of the beans, then subjecting the beans to the extractive action of water of the required temperature, then precipitating the caffeic acid, caffetannic acid, salts, etc., from the watery solution, then extracting from the remaining watery solution the caffein, with a volatile solvent.

7. The herein described process of obtaining coffee beans free from caffein, which consists in first effecting a limited germination of the beans, then subjecting the beans to the action of hot water to remove the soluble matter from the beans, then precipitating from such solution, all of its contents with the exception of caffein, reincorporating such separated materials with the coffee beans and finally drying the beans.

8. The herein described process of removing caffein from coffee beans, which consists in primarily effecting a limited germination of the bean, and secondarily subjecting the bean to the action of a body which will remove the soluble constituents of the treated bean.

9. The herein described process of removing caffein from coffee beans, which consists in primarily effecting a limited germination of the beans until the presence of maltose can be detected, and secondarily subjecting the beans to the action of a body which will stop germination and remove the soluble constituents of the treated bean.

10. As a new article of manufacture, green coffee beans having their cellular structure altered by limited germination, and from which the major portion of the normally contained caffein has been removed.

11. As a new article of manufacture, green coffee beans having their interior cellular structure broken down by the act of limited germination, and from which the major portion of the originally contained caffein has been removed.

12. As a new article of manufacture, green coffee beans having their cellular structure partially converted into maltose, and from which the major portion of the normally contained caffein has been removed.

In testimony whereof, I affix my signature, in the presence of two witnesses.

ROBERT HÜBNER.

Witnesses:
HENRY G. GIFFORD, Jr.,
ELIZABETH BARNETT.